March 17, 1953     B. J. CRAIG     2,631,355
COMPOSITION AND PROCESS OF MAKING THE SAME
Filed June 9, 1944     3 Sheets-Sheet 1
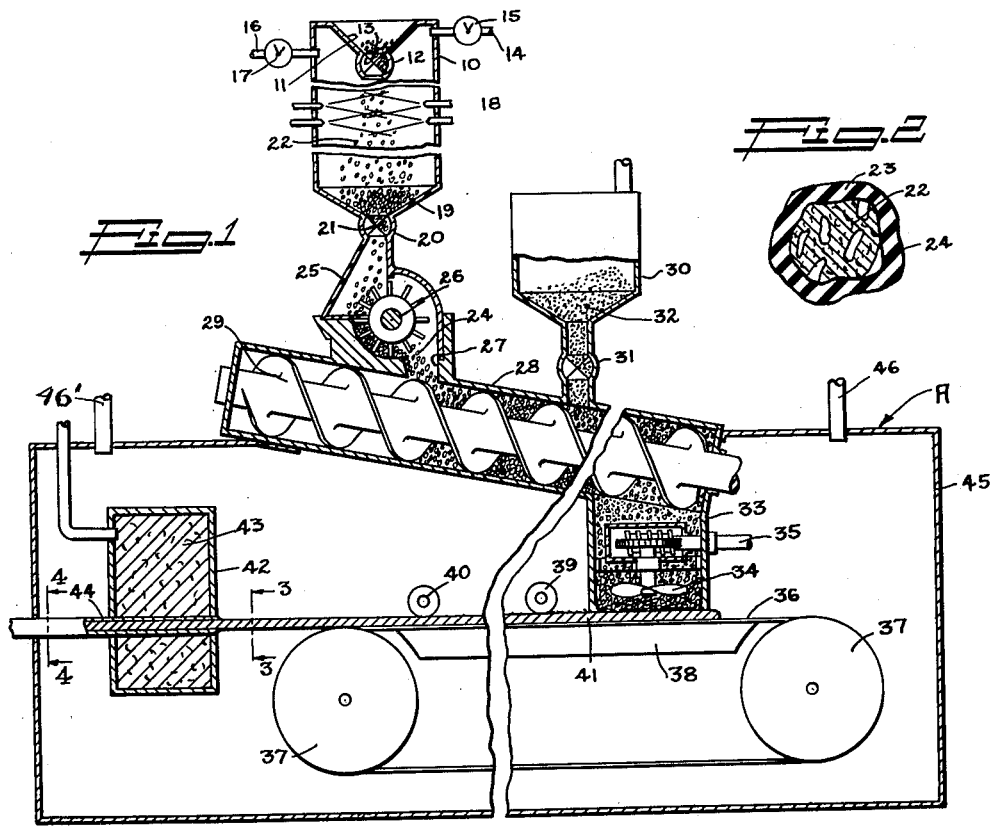
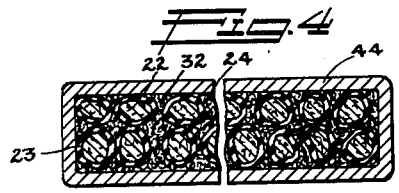
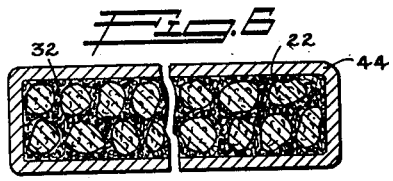
INVENTOR.
B. J. Craig

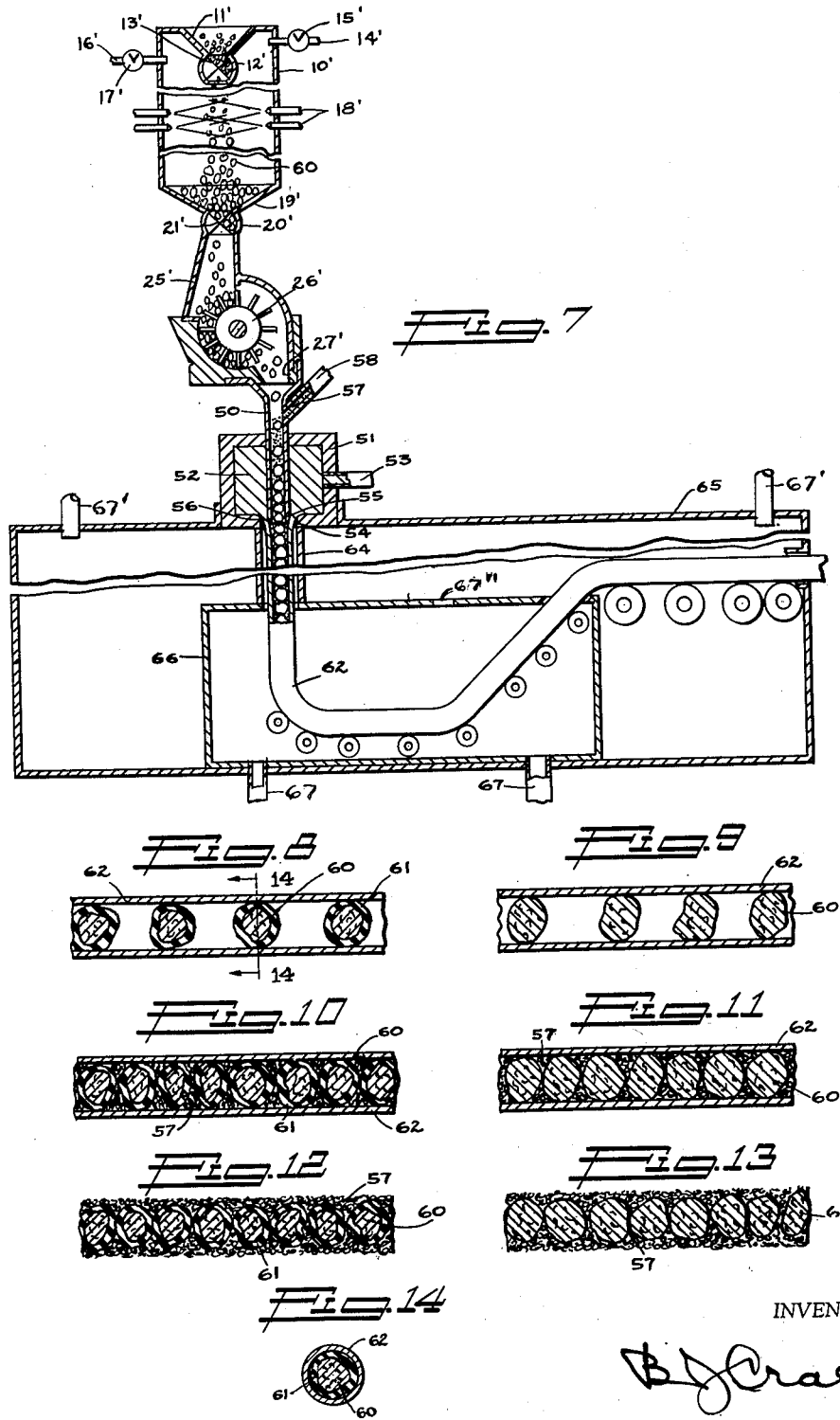

March 17, 1953 B. J. CRAIG 2,631,355
COMPOSITION AND PROCESS OF MAKING THE SAME
Filed June 9, 1944 3 Sheets-Sheet 3
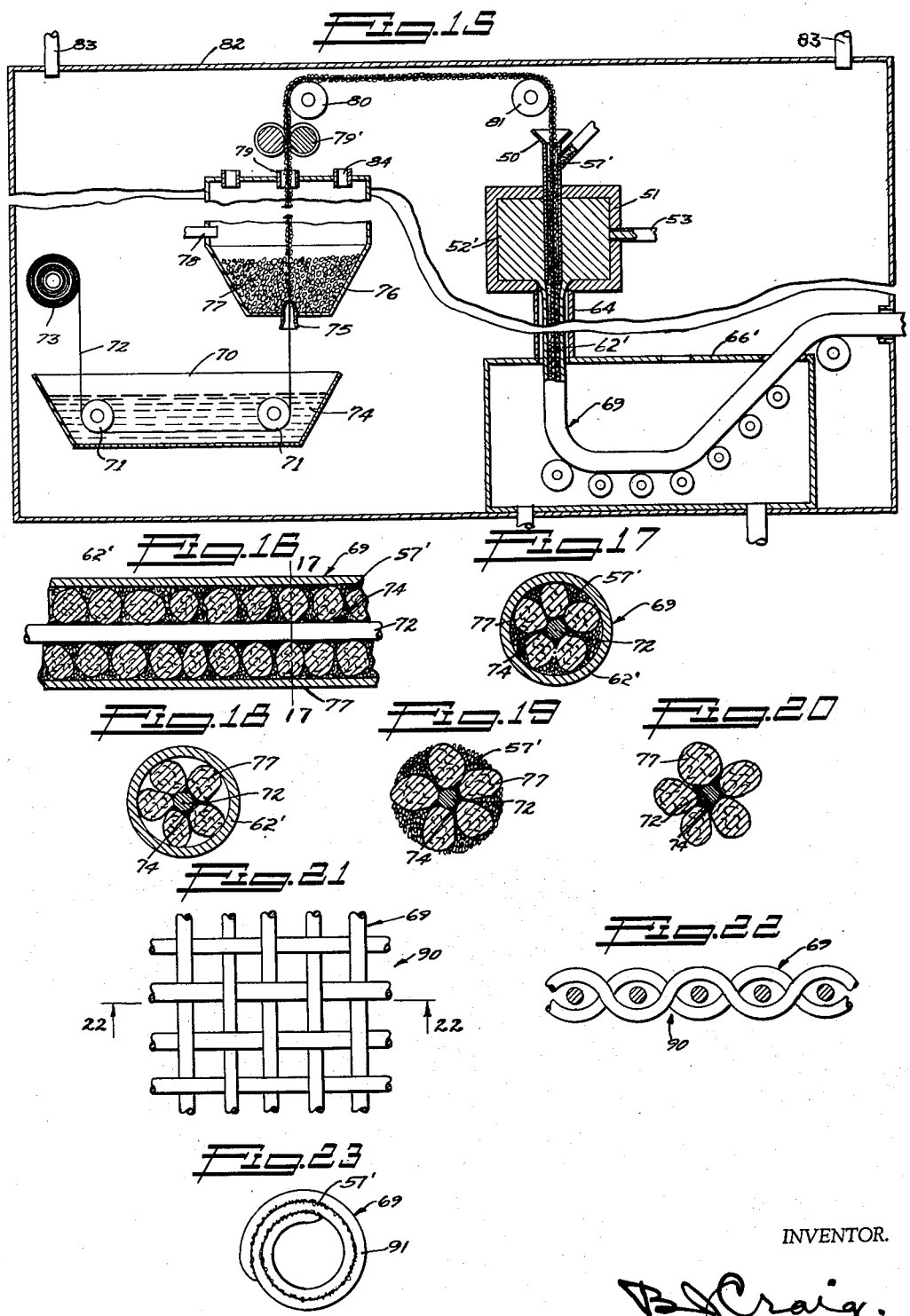
INVENTOR.
B. J. Craig.

Patented Mar. 17, 1953

2,631,355

UNITED STATES PATENT OFFICE 2,631,355

COMPOSITION AND PROCESS OF MAKING THE SAME

Burnie J. Craig, San Gabriel, Calif.

Application June 9, 1944, Serial No. 539,589

14 Claims. (Cl. 28—80)

In the manufacture of composition cork the comminuted cork is mixed with a binder and the mixture is fed to a suitable forming machine or die. Care must be taken to insure a thorough mixing and there should be no swelling or distorting of the cork particles or any premature insolubilizing of the binder.

Also, in manufacturing cork compositions, when the binder and cork particles are mixed, there is a tendency for the binder to enter the pores of the cork and remain in the pores and there is also a tendency for the binder to enter the pores during the molding or other treating of the composition in the steps of making the finished product.

It is one of the objects of this invention to provide a composite cork preparation which overcomes the difficulties mentioned and which has desirable physical properties.

Another object of the invention is to provide a novel method of making a composition which includes porous members.

A further object of the invention is to provide a novel porous composition.

An additional object of the invention is to provide a novel apparatus for making a porous composition.

A further object of the invention is to provide a novel method of making a cork composition wherein cork particles, while in an atmosphere of gas above atmospheric pressure, are mixed with a binder, after which the binder is insolubilized.

A further object of the invention is to provide a novel method wherein porous particles, while containing gas, are individually or in groups covered with a film which entraps the contained gas.

An additional object of the invention is to provide an improved cork composition including cork particles wherein the particles contain entrapped gas which may have a pressure greater than atmospheric pressure.

A further object of the invention is to provide a novel method of making a cork composition wherein cork particles, while containing a gas under pressure, are mixed with a binder and thereafter the pressure exterior to the composition is reduced to permit the entrapped gas to expand so that it tends to force binder from the pores of the cork particles.

A further object of the invention is to provide a novel method of making a cork composition wherein cork particles, while containing a gas under pressure, are mixed with a binder and thereafter the pressure exterior to the composition is reduced to less than that of the entrapped gas, thus permitting the entrapped gas to expand and to force binder from the pores of the cork particles, after which the binder is insolubilized.

Another object of the invention is to provide a novel method of making a cork composition wherein cork particles, while containing gas under pressure above atmospheric, are individually or in groups covered with a film which entraps the contained gas, after which the gas entrapping particles are secured together to form a composition or a thread-like member.

Another object of the invention is to provide a novel method of making a cork composition wherein cork particles, while containing gas under pressure above atmospheric, are individually or in groups covered with a film which entraps the contained gas, after which the gas entrapping particles are mixed with a binder under pressure conditions which may permit the entrapped gas to expand.

A further object of the invention is to provide a novel cellular system.

Another object of the invention is to provide a novel method making a cellular system.

A further object of the invention is to provide a novel apparatus for making a cellular system.

A further object of the invention is to provide a novel cellular composition member having a core therein.

A further object of the invention is to provide a composition including a core having gas containing, porous members thereabout.

A further object of the invention is to provide a novel method of making a composition which includes a core with deformable members thereabout.

A further object of the invention is to provide a novel apparatus for making a cork composition.

Other objects and advantages of the invention will be apparent from the following description taken in connection with the accompanying drawings, wherein:

Fig. 1 is a central sectional view through an apparatus embodying the features of the invention;

Fig. 2 is a sectional view showing one of the particles;

Fig. 3 is a section taken on line 3—3, Fig. 1, showing the material;

Fig. 4 is a section taken on line 4—4, Fig. 1, showing the material;

Fig. 5 is a view similar to Fig. 3, showing material when the individual covering for the particles is omitted;

Fig. 6 is a view similar to Fig. 4, showing material when the individual covering for the particles is omitted;

Fig. 7 is a view similar to Fig. 1, showing a modified apparatus;

Fig. 8 is a longitudinal, central, sectional view showing the cellular system with the binder omitted;

Fig. 9 is a view similar to Fig. 8, showing material with the binder and the particle covering omitted;

Fig. 10 is a section showing material with the particle covering, outer covering and binder;

Fig. 11 is a sectional view showing material with the particle covering omitted;

Fig. 12 is a view similar to Fig. 10 with the outer covering omitted;

Fig. 13 is a view similar to Fig. 11 with the outer covering omitted;

Fig. 14 is a section taken on line 14—14, Fig. 8;

Fig. 15 is a view similar to Fig. 1, showing a further modification;

Fig. 16 is a longitudinal, central, sectional view, showing the tensile member and associated parts;

Fig. 17 is a section taken on line 17—17, Fig. 16;

Fig. 18 is a view similar to Fig. 17 with the binder omitted;

Fig. 19 is a view similar to Fig. 17 with the outer cover omitted;

Fig. 20 is a view similar to Fig. 17 with both cover and binder omitted;

Fig. 21 is a plan view of a fabric embodying features of the invention;

Fig. 22 is a section on line 22—22, Fig. 21, and

Fig. 23 is a top plan view of a packing member.

Referring to the drawing by reference characters, an apparatus embodying the features of the invention is indicated generally at A. This apparatus includes a housing 10, having a funnel shaped container 11 in the top thereof. The container has a cylindrical hopper portion 12 at the bottom thereof in which a rotating hopper gate 13 is mounted. The interior of the housing communicates with a gas pressure conduit 14 and with a constant pressure outlet valve 15 which determines the minimum air pressure within the housing 10. Also communicating with the interior of the housing 10 I show an outlet 16 with a constant pressure inlet valve 17 therein which determines the maximum pressure within the housing.

Extending into the housing I show a plurality of injection jets 18. The bottom of the housing is tapered inwardly as at 19 and has a cylindrical hopper portion 20 at the bottom thereof in which a rotating hopper gate 21 is mounted.

In operation, porous particles 22 are placed in the container 11 while gas under pressure is maintained within the housing 10 by means of the conduit 14 and is maintained at a desired pressure by means of the valves 15 and 17. As the rotating hopper gate 13 is rotated, the small particles of porous material are allowed to fall into the housing and through the path of the sprays where they become coated with covering material. As the particles fall they may be vulcanized or cured so that when the particles reach the bottom portion of the housing they may be removed by means of the rotating hopper gate 21. Thus it may be seen that compressed gas is entrapped in the pores of the porous particles and sealed therein by the coating of material 23 about each particle as shown in Fig. 2.

The members 24, formed as described, are compressible as well as resilient and elastic due to the contained gas and due to their natural properties.

The porous particles pass from the gate 21 to a discharge spout 25, whence they pass through a distributor 26 which is preferably regulated to run at a proper speed so that the particles are fed evenly. From the distributor 26 the particles pass through a discharge portion 27 into a cylindrical member 28 which contains a conveyor, shown as a rotating screw 29, which is suitably driven to rotate and to advance the particles 24 along the member 28.

A hopper 30, having a discharge feed valve 31 therein, communicates with the member 28. The hopper 30 receives a binder element 32 which is discharged on the particles within the member 28. The member 28 includes a discharge portion 33 which includes an impeller 34 driven by a suitable means 35. The impeller 34 agitates and forces along the mixture of binder and particles 24 and discharges the material into a conveyor 36 which runs over drums 37 whose upper reach is supported by a table 38. Rollers 39 and 40 serve to smooth the composition which is indicated at 41. The composition may advance through a coating chamber 42 which contains a coating or covering material 43. The chamber 42 has opposed slots of slightly greater area than the cross section area of the composition 41, so that the coating 44 is applied about the composition as the latter passes through the chamber 42.

The gas in the container 10 has a pressure preferably above that of the atmosphere and, since the parts are enclosed, the gas entrapped in the particles 24 has a pressure above atmospheric. The binder is fed into the chamber 28 under a pressure which is preferably equal to the pressure of the entrapped gas, so that upon the mixing of the binder and particles there is no tendency for a change in volume of the particles. The conveyor 36 and associated parts are arranged in a container 45 in which an evaporative atmosphere and a coagulating bath may be maintained at a desired pressure by pipes 46 and 46′.

The pressure in the container 45 is preferably less than the pressure of the gas entrapped in the particles, so that when the plastic composition becomes subject to the pressure in the container 45 the drop in pressure will cause the particles to expand as the gas contained therein expands.

The manner in which the particles are united and/or treated and/or finished will depend upon the intended use of the finished composition. For example, in the composition shown in Fig. 3 the coated, gas entrapped members 24 are secured together by a binder 32, but there is no outside cover. Omission of a supply of coating material 43 provides this type. In Fig. 4 the composition is the same as that shown in Fig. 3 except that an outside coating 44 is provided. In Fig. 5 the coating 23 and coating 44 are omitted to provide a composition which includes air entrapped particles 22, held by a binder 32. In Fig. 6 the composition is the same as that shown in Fig. 5 except that an outside coating 44 is applied.

In Fig. 7 the disclosure includes a housing 10' and parts which are similar to the housing 10 and associated parts previously described and similar parts are designated by similarly primed reference numerals. In Fig. 7 the discharge portion 27' communicates with a tube 50 which extends through a container 51 to which coating material 52 is supplied through a tube 53. The container 51 has an outlet 54 coaxial with, and of larger diameter than, the lower end 55 of the tube 50, which is disposed in the outlet 54 so that an annular passage 56 is provided through which the material is extruded. Binder material 57 is supplied by a pipe 58 which is shown as communicating with the tube 50 above the container 51.

As the particles 60 advance they are first covered with a coating 61 similar to the coating 23 previously described. The coated gas entrapping particles pass into the tube 50 where they may be mixed with binder 57. The particles and binder are then discharged from the tube 50 into the tube 62 which is formed by the extruded material 52. The tube 62, with particles therein and with the binder, passes through a tube 64 in a housing 65 into a chamber 66 in the housing where a coagulating bath or evaporative atmosphere may be supplied by pipes 67 to finish the material. From the chamber 66 the material passes to the housing 65 from which it may be carried and packaged for shipment.

When an evaporative atmosphere is employed in the chamber 66 this may be supplied by pipes 67 or pipes 67' since the housing 65 and chamber 66 communicate through an opening 67''. When a bath is provided in the chamber 66 the bath material may be supplied by pipes 67 and a gas under pressure by the pipes 67'. The pressure in the housing 65 and chamber 66 may be greater than, the same as, or less than, the pressure of the gas entrapped within the particles. If the pressure is greater it will tend to cause the tube 62 to more tightly engage the particles prior to the curing of the tube so that the particles will be clamped by the tube. If the pressure is less than that of the entrapped air in the particles, the particles and tube will tend to expand prior to finishing the tube so that a more buoyant cellular system will be provided.

The material shown in Fig. 10 will be produced by operating the machine with all of the material supplied thereto. When the binder is omitted, material such as shown in Fig. 8 is produced and when both binder and particle covering are omitted, material shown in Fig. 9 results. When the particle covering only is omitted the material shown in Fig. 11 results, while, when the outer covering is omitted, the material shown in Fig. 12 results. When the particle covering and outer covering are omitted, material of the character shown in Fig. 13 will be produced.

In Fig. 15 an apparatus is disclosed which is adapted for making cellular systems 69, containing a tensile member. This apparatus includes a container 70 in which a pair of guide rolls 71 are mounted. A core, tensile member or filament is supplied from a roll 73 and passes over the rolls 71 through the container 70 which is adapted to contain adhesive material 74 through which the filament 72 passes and is coated therewith. From the container 70 the adhesive coated filament passes through an inlet tube 75 in the bottom of a container 76 which contains porous granules 77. The granules adhere to the adhesive on the filament 72 as shown in Fig. 15. The container 76 is provided with a supply of warm air or other drying agent from a nozzle 78 so that the adhesive is dried or cured as it passes through the upper portion of the container 76.

The filament and attached porous particles pass through an outlet 79 between rolls 79' and over rolls 80 and 81 which may be driven to suitably advance the filament. From the roll 81 the filament passes downwardly into a tube 50' and to an apparatus similar to that shown at 51, 52, 53, etc., Fig. 7. In Fig. 15 parts corresponding to those previously described in connection with Fig. 7 are designated by similarly primed reference numerals.

As the filament with the porous particles thereon passes through the tube 50' it is covered with a binder 57' and as it passes downwardly coating material 52' is extruded to form a tube or coating 62' which is disposed about the granules 77. The entire apparatus shown in Fig. 15 is enclosed in a housing 82 and gas under pressure is supplied to the housing from pipes 83. The air under pressure enters the container 76 through openings 84, causing the pores in the particles therein to be filled with compressed gas. The container 66' which may contain a coagulating bath or evaporative atmosphere is similar to the container 66 previously described.

In Fig. 17 the cellular member is shown as including a filament 72 having adhesive 74 thereupon and having particles 77 connected thereto by the adhesive. The system also includes a binder 57' and outer cover 62'.

In Fig. 18 the construction is the same as shown in Fig. 17 except that binder 57' is omitted.

In Fig. 19 the construction differs from that shown in Fig. 17 in that the cover is omitted while in the construction shown in Fig. 20 both the covering and binder are omitted.

In Figs. 21 and 22 a fabric 90 is disclosed. This is made by weaving the cellular members 69 in a suitable manner. Other cellular members of the character disclosed in the preceding description may be employed in making the fabric. It will be understood that the fabric will be buoyant, flexible and pliant and that due to the contained porous members it will have sufficient body to permit its use for many purposes.

In Fig. 23 a packing member 91 is disclosed. This member may be made by arranging one of the strands described above in the desired shape and then securing it in this shape by means of the binder.

The porous particles may consist of comminuted cork, sponge rubber, wood pith or natural sponge.

The entrapped gas may be air, nitrogen, hydrogen, oxygen or carbon dioxide.

The covering material may be regenerated cellulose formed from viscose, lowly etherified or esterified cellulose derivatives, soluble in aqueous alkaline solution such as lowly etherified methyl, ethyl or glycol cellulose, and lowly esterified cellulose acetate, highly esterified cellulose derivatives soluble in organic solvents such as cellulose acetate, cellulose propionate, cellulose acetate-propionate, methyl, ethyl, ethyl or benzyl cellulose, colloidal dispersions of proteins such as casein, gelatin and the like. Other material such as artificial resins of various kinds may be used.

The covering material might also be natural rubber or a synthetic of the butadiene co-polymer type such as Buna-S rubber, a synthetic of the chloroprene polymer type, such as neoprene, a synthetic of the isobutylene polymer type having small quantities of other diolifines such as isoprene or butadiene, such as Butyl rubber or a plasticized vinyl chloride polymer, such as Koroseal. The natural or artificial rubber may be employed in latex form with the latices applied to the particles in sufficient quantities to provide the necessary thickness.

The binder and/or the material which secures the particles to the core may be a thermo setting type such as urea, phenolic or alkyd resinous materials or albumens or proteins treated with a material to insolubilize them upon heating, or other types of binders may be employed as, for example, raw natural rubber which may be vulcanized for the binding effect; also latices may be employed as binders and regenerated cellulose formed from viscose may be employed.

The covering material with the contained particles may be extruded into a coagulating bath or into an evaporating atmosphere so that the material will have the desired physical characteristics.

The core or tensile member may consist of a linen, cotton or silk thread or a rubber thread, or it may be made of wire such as copper.

Having thus described the invention, I claim:

1. A composition comprising compressible porous flexible, independent particles, each particle having a gas impervious coating completely surrounding it, each particle containing gas at a pressure above atmospheric pressure, and flexible means holding the particles together.

2. A composition comprising compressible porous, flexible particles, each particle having an independent covering, and a binder holding the covered particles in a unitary mass.

3. A flexible cellular system comprising a plurality of flexible porous particles, a flexible gas impervious covering surrounding each particle, and a flexible, tubular elongated member arranged about the covered particles to form a strand.

4. A flexible cellular system comprising a plurality of porous particles, gas in the pores of said particles, a gas impervious covering surrounding each particle, means binding the particles and coverings together, and a flexible tubular covering about the binder.

5. A method of making a porous composition comprising taking porous flexible particles, separating the particles, spraying a flexible, air impervious, independent covering on each of the particles while they are separated to provide a plurality of independently covered porous members, and thereafter uniting the independent members by a binder which unites the members.

6. The method of making a cellular system comprising taking independent comminuted flexible particles and arranging the particles in axial alignment and uniting the particles and thereafter placing a continuous flexible covering over the united particles to form a flexible strand.

7. The method of making a cellular system comprising taking comminuted porous particles, running an adhesive bearing, flexible, tensile member through the particles to cause the particles to adhere to the tensile member, forcing the porous particles against the tensile member, arranging a binder about the particles and tensile member to form a unitary mass, and thereafter placing a covering about the binder and particles.

8. As an article of manufacture, a granule of flexible, compressible material having outwardly opening surface pores, said granules having a flexible, impervious coating completely surrounding and covering the granule and closing the surface pores thereof and a filling of gas in the pores of the granule, the gas being at a pressure above atmospheric and tending to force the coating from the pores, the gas pressure being below the pressure at which the coating would be ruptured.

9. A flexible cellular system having a flexible filamentous core and porous, compressible, flexible, resilient particles inflated to a pressure above atmospheric and entirely surrounding the core and secured to the core to form a strand.

10. A flexible cellular system comprising a plurality of flexible, compressible, independent particles, said particles having outwardly opening pores therein, said pores containing gas under pressure, sealing means about the particles and sealing the pores to entrap the contained gas therein, and a flexible covering about the sealing means and the particles sealed thereby.

11. A cellular system comprising a continuous, elongated, flexible, resilient, tubular member having a plurality of spaced, flexible, resilient members secured therein.

12. A fabric including woven strands, each strand comprising a continuous, elongated member including a plurality of particles having outwardly opening pores therein, said particles being arranged in a filamentous manner to form a thread, and means sealing the pores and uniting the particles.

13. A flexible cellular system including a flexible core having a single layer of porous, compressible particles surrounding and secured to the core, a binder about the particles, and a flexible, continuous, tubular member surrounding and engaging the binder and particles.

14. A fabric including woven strands, each strand comprising a continuous, elongated member including a plurality of particles having outwardly opening pores therein, said particles being arranged about a filament per se and means sealing the pores and uniting the particles to form a coated thread.

BURNIE J. CRAIG.

REFERENCES CITED

The following references are of record in the file of this patent:

UNITED STATES PATENTS

| Number | Name | Date |
|---|---|---|
| Re. 13,667 | Pfleumer | Dec. 30, 1913 |
| Re. 15,957 | Fulton | Dec. 2, 1924 |
| 834,611 | Garlock | Oct. 30, 1906 |
| 1,002,829 | Dunning | Sept. 12, 1911 |
| 1,625,855 | Fernandez | Dec. 13, 1927 |
| 1,756,950 | McManus | May 6, 1930 |
| 1,766,892 | Fisher | June 24, 1930 |
| 1,847,707 | Abraham | Mar. 1, 1932 |
| 1,454,823 | Smith | May 8, 1933 |
| 1,943,858 | Dwight | Jan. 16, 1934 |
| 1,977,787 | Wodtke | Oct. 23, 1934 |
| 1,987,120 | Loomis | Jan. 8, 1935 |
| 1,990,937 | Forbes | Feb. 12, 1935 |
| 1,993,343 | Harlow | Mar. 5, 1935 |
| 2,070,600 | Jenett | Feb. 16, 1937 |
| 2,096,816 | Lilley | Oct. 26, 1937 |
| 2,112,545 | Roe | Mar. 29, 1938 |

(Other references on following page)

UNITED STATES PATENTS

| Number | Name | Date |
|---|---|---|
| 2,115,079 | Lilley et al. | Apr. 26, 1938 |
| 2,137,887 | Abbott | Nov. 22, 1938 |
| 2,146,314 | Radford | Feb. 7, 1939 |
| 2,204,737 | Swallow et al. | June 18, 1940 |
| 2,242,037 | Levin | May 13, 1941 |
| 2,248,105 | McGrew | July 18, 1941 |
| 2,259,879 | Denning | Oct. 21, 1941 |
| 2,286,230 | Roberts et al. | June 16, 1942 |
| 2,286,922 | Muller | June 16, 1942 |
| 2,288,327 | Scherer | June 30, 1942 |
| 2,290,914 | Machlin | July 28, 1942 |
| 2,328,998 | Radford | Sept. 7, 1943 |
| 2,340,260 | Clunan | Jan. 25, 1944 |
| 2,350,989 | Craig | June 13, 1944 |
| 2,394,122 | Urmston | Feb. 5, 1946 |
| 2,421,625 | Kretschmer | June 3, 1947 |
| 2,433,849 | Lathrop et al. | Jan. 6, 1948 |

FOREIGN PATENTS

| Number | Country | Date |
|---|---|---|
| 544,740 | Great Britain | Apr. 27, 1942 |